United States Patent [19]
Throop et al.

[11] Patent Number: 5,855,270
[45] Date of Patent: Jan. 5, 1999

[54] FRUIT ORIENTING DEVICE

[75] Inventors: James A. Throop, Newfield; Daniel J. Aneshansley, Ithaca, both of N.Y.; Bruce L. Upchurch, Springfield, Ga.

[73] Assignees: Cornell Research Foundation, Inc., Ithaca, N.Y.; U.S. Dept. of Agriculture, Washington, D.C.

[21] Appl. No.: 735,511

[22] Filed: Oct. 23, 1996

Related U.S. Application Data

[63] Continuation-in-part of Ser. No. 491,805, Jun. 19, 1995, abandoned.

[51] Int. Cl.⁶ .................................................. B65G 17/32
[52] U.S. Cl. .......................... 198/394; 198/387; 198/779; 209/912
[58] Field of Search .................. 198/384, 385, 198/387, 779; 209/538, 912

[56] References Cited

U.S. PATENT DOCUMENTS

| | | | |
|---|---|---|---|
| Re. 26,111 | 11/1966 | Amori | 198/385 |
| 2,296,645 | 9/1942 | Marsden | 198/779 |
| 2,907,440 | 10/1959 | Hait | 198/387 |
| 3,011,620 | 12/1961 | Amori | 198/387 |
| 3,225,892 | 12/1965 | Keesling | 198/382 |
| 3,389,730 | 6/1968 | Anderson et al. | 198/436 |
| 3,403,769 | 10/1968 | Anderson et al. | 198/384 |
| 3,460,668 | 8/1969 | Gerrans | 198/779 |
| 3,575,292 | 4/1971 | Roda | 209/912 |
| 3,738,474 | 6/1973 | Ellis | 198/385 |
| 4,005,774 | 2/1977 | Casanova Valero | 198/384 |
| 4,169,528 | 10/1979 | Amstad | 198/385 |
| 4,482,061 | 11/1984 | Leverett | 209/912 |
| 4,706,797 | 11/1987 | Carlson | 198/394 |
| 4,730,719 | 3/1988 | Brown et al. | 198/387 |
| 4,746,001 | 5/1988 | Tichy | 198/387 |
| 4,981,205 | 1/1991 | Cowlin | 198/387 |
| 5,190,137 | 3/1993 | Tas | 198/779 |

FOREIGN PATENT DOCUMENTS

| | | | |
|---|---|---|---|
| 591035 | 1/1960 | Canada | 198/387 |
| 617769 | 5/1961 | Canada | 198/387 |

OTHER PUBLICATIONS

Rehkugler, G. E. et al., "Apple Sorting With Machine Vision", Transactions of the ASAE Amer. Sociey of Agricultural Eng., vol. 29(5), Sep.–Oct. 1986, pp. 1388–1397.

Rehkugler, G. E. et al., "Optical–Mechanical Bruised Apple Sorter", ASAE Publication 1–76, Quality Detection in Foods, American Socity of Agricultural Eng., Dec. 1974, 5 pages.

*Primary Examiner*—David A. Bucci
*Assistant Examiner*—Thuy V. Tran
*Attorney, Agent, or Firm*—Jones, Tullar & Cooper

[57] ABSTRACT

A fruit or other produce orienting device, particularly suited for orienting apples, orients a piece of fruit with its stem axis horizontal so that it can undergo quality inspections. The device employs a cylindrical drive roller which engages the fruit on one side, and causes it to rotate, and a pair of freely rotating orienting rollers which engage the fruit across from the drive roller, and cause the fruit to achieve the desired orientation as it rotates. The first orienting roller is cone shaped with a tapered flat or concave surface so that it will steer the fruit toward the second, opposing roller, which has a thin disk shaped portion with a front surface that engages the fruit. The front surface of the disk shaped portion tends to align itself with the flat edge of the fruit at its stem or calyx end, and this causes the rotating fruit to be oriented quickly with its stem axis parallel to the roller axes, and then maintains the fruit in the correct orientation once it is achieved.

8 Claims, 8 Drawing Sheets

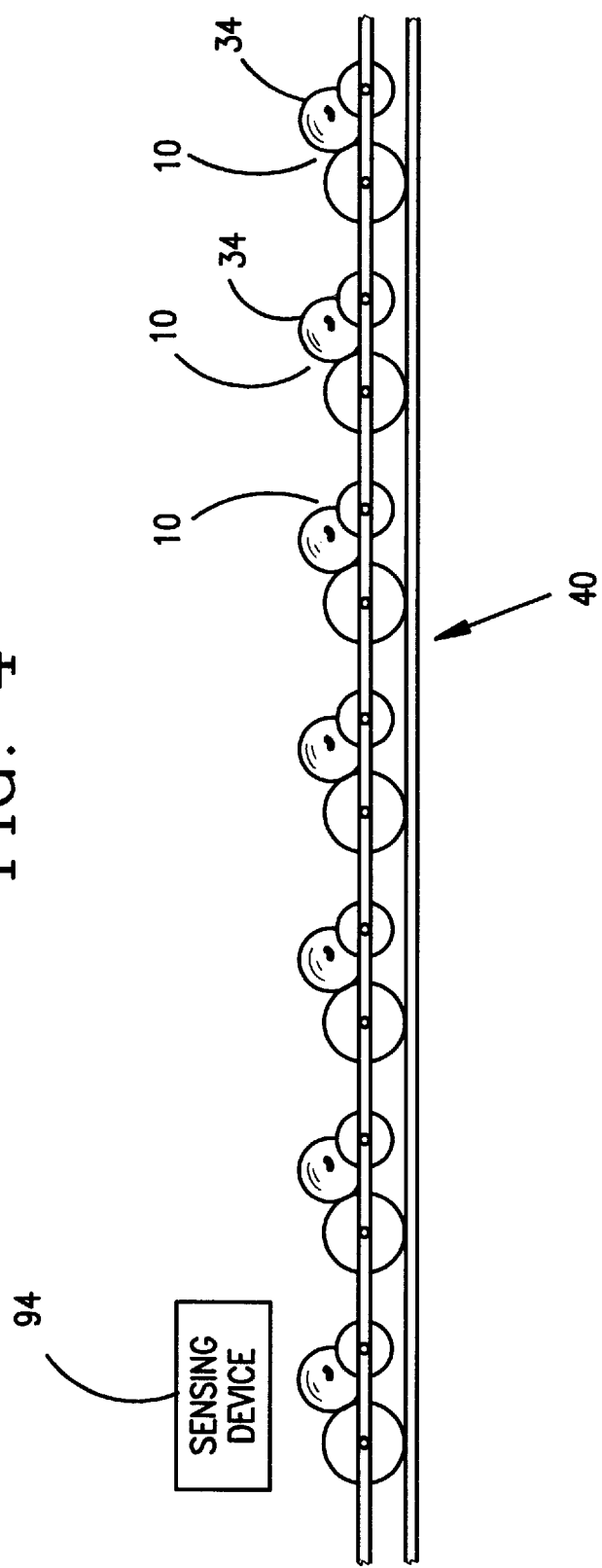

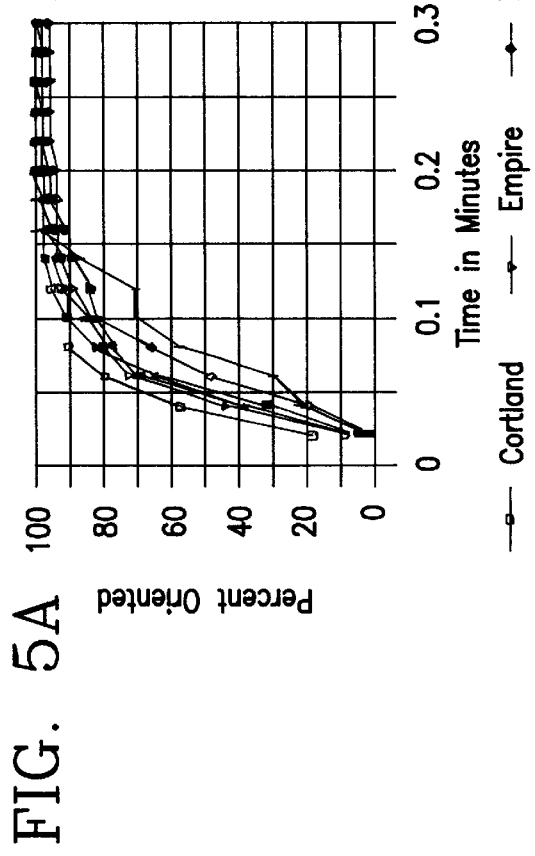
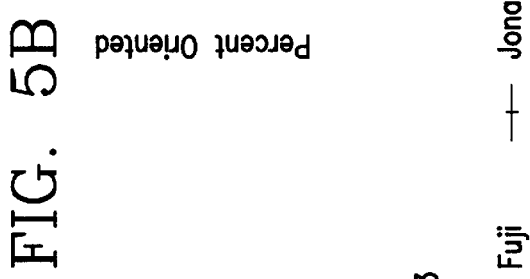
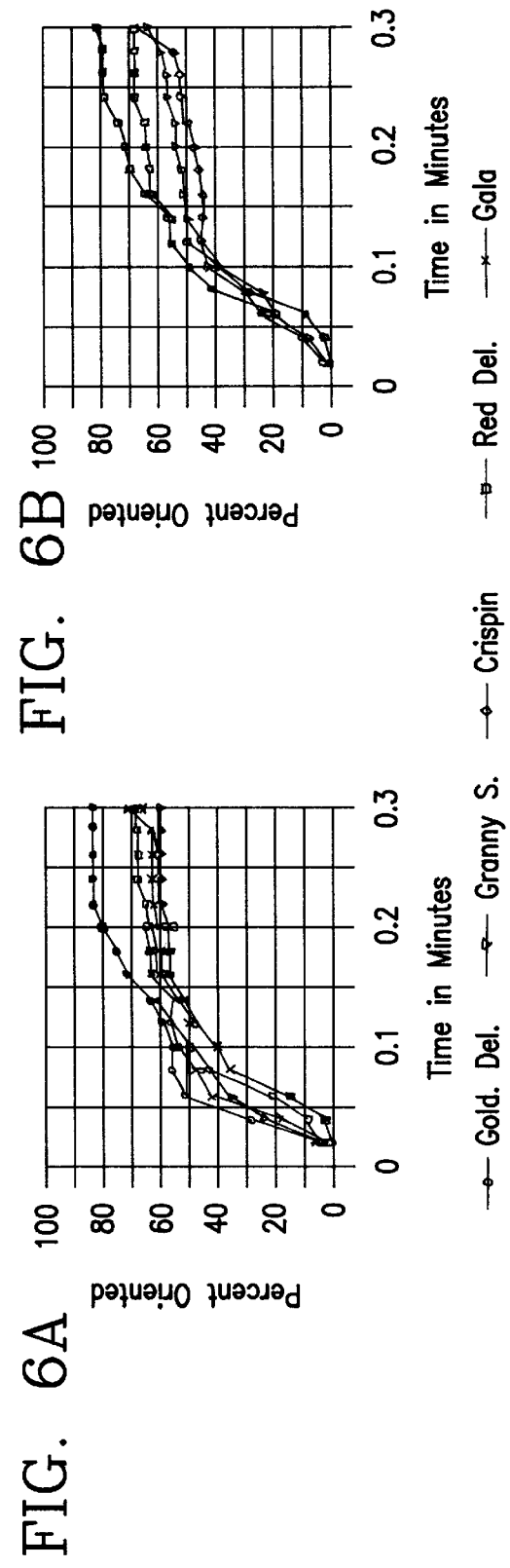
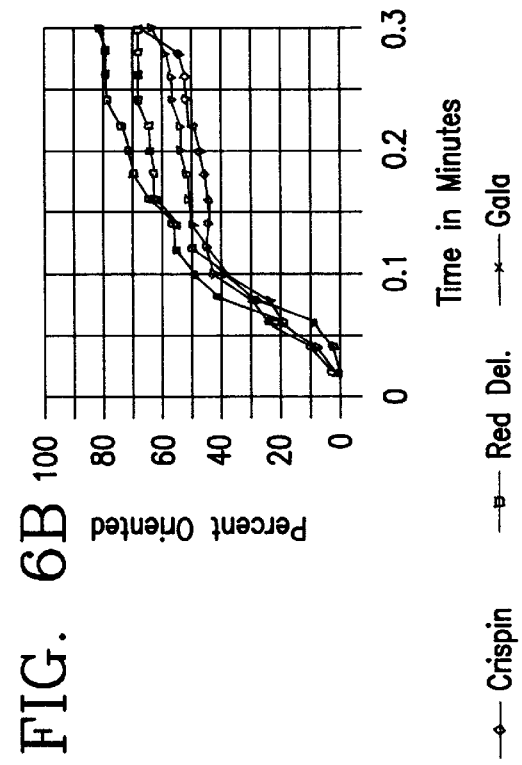

FRUIT ORIENTING DEVICE

This application is a continuation-in-part of application No. 08/491,805, filed Jun. 19, 1995, now abandoned.

The present invention was made with Government support under Grant No. 58-1931-3-001, awarded by the USDA-ARS. The Government has certain rights in the invention.

BACKGROUND OF THE INVENTION

The present invention relates in general to a fruit orienting device for use with automatic sorting equipment that properly positions fruit or other produce, such as apples, for quality inspections.

Considerable effort has been placed on developing non-destructive sensor techniques for sensing the internal and surface quality of apples. Examples of these techniques include optical imaging systems for detecting bruises and other surface defects on the apples, and firmness testing devices which determine the firmness of an apple by tapping its surface, and sensing resulting acoustic vibrations therein. To work properly, both of these techniques require that the tests be performed on the apple's cheek. In the optical imaging technique, this requires that the imaging system be able to discriminate between the bruises or other surface defects, and the apple's stem or calyx.

One known technique for discriminating between surface defects and the stem or calyx is to employ complicated algorithms which can differentiate the concave surfaces around the stem/calyx ends from blemishes on the rest of the convex apple surface. Unfortunately, the use of such complicated algorithms slows down the apple sorting process, and this is unacceptable because the fruit packing industry requests that apples must be sorted at rates of 6–10 apples per second.

A more promising solution to this problem is to orient the apples prior to being imaged so that only the apple cheeks will be viewed by the imaging optics. This usually necessitates that the apples be oriented on a conveying device with their stem axes horizontal so that the apples can be rolled beneath the imaging optics, first for a preinspection for proper orientation with a reroute of improperly oriented fruit back to the beginning of the orientation process, and then for an inspection of the apple cheeks for bruises and other surface defects. This appears to be the most promising technique, for it eliminates the need for time consuming complex algorithms. In addition, this technique must be employed with firmness measuring devices and other quality measuring devices since such devices do not employ any optical means by which the cheek of the apple can be discriminated from the stem or calyx.

Unfortunately, all previously known techniques for orienting apples so that their stem axes are horizontal do not reliably orient the apples in the desired manner. For example, one known device employs a plurality of rollers which contact an apple at three locations on its surface. One of the rollers is a cylindrical roller that is driven to cause the apple to rotate so that its entire surface can be viewed by the imaging system. The other two rollers are positioned adjacent to the cylindrical roller on a common shaft, and are cone shaped with tapered apple engaging surfaces that tend to hold the apple between these two rollers. Although this device is capable of orienting various types of apples with their stem axes in a horizontal direction, it does not do so quickly and dependably, and often cannot maintain the proper orientation if and when it is achieved.

SUMMARY OF THE INVENTION

In view of the foregoing, it is the object of the present invention to provide an improved fruit orienting device which can quickly and dependably orient pieces of fruit, particularly apples, with their stem axes in a horizontal direction.

This and other objects of the invention are achieved through provision of an orienting device which comprises a drive roller for engaging a generally spherical piece of fruit or other produce on one side and causing it to rotate, and a pair of freely rotating orienting rollers that are positioned adjacent the drive roller in such a manner that they also engage the fruit. The first of the orienting rollers is cone shaped with one end diameter being larger than its other end diameter, thereby forming a tapered outer engaging surface that tends to direct the fruit into engagement with the second roller. Preferably, the outer surface of the roller is concave to better accommodate the spherical shape of the object (e.g. fruit or other produce) to be oriented, although the outer surface can also be flat and still produce good results. The second roller is disk shaped with a front engaging surface that contacts the flat edge of the fruit adjacent one of its ends. Both of the orienting rollers are preferably spring biased toward one another to allow lateral movement for varying sizes of fruit.

In contrast with the previously discussed known apple orienting device in which the two orienting rollers both comprise opposed cone shaped rollers, the use of the disk shaped roller in conjunction with the roller having the tapered concave or flat engaging surface in the present invention results in substantially improved orientation speed, accuracy and maintenance. This is because the disk roller's front surface forms a contact surface which can align itself with the fruit edge at the stem/calyx ends, thus providing quick horizontal orientation of the fruit, and stability to the revolving fruit once oriented.

BRIEF DESCRIPTION OF THE DRAWINGS

The features and advantages of the present invention will become more apparent from the following detailed description of a preferred embodiment thereof, taken in conjunction with the accompanying drawings in which:

FIG. 4 is a schematic illustration of a fruit conveyer employing a plurality of the orienting devices of FIGS. 1–3;

FIGS. 5A and 5B are graphs illustrating experimental results obtained using the concave surfaced roller variation of the preferred embodiment of the present invention to orient apples, with FIG. 5A illustrating the percentage of apples properly oriented as a function of time for five different types of size 128 apples being rotated at 60 rpm, and FIG. 5B illustrating the percentage of apples properly oriented as a function of time for five different types of size 88 apples rotated at a speed of 60 rpm;

FIGS. 6A and 6B are graphs illustrating additional experimental results obtained using the concave surfaced roller variation of the preferred embodiment of the present invention to orient apples, with FIG. 6A illustrating the percentage of apples oriented from an axis of rotation perpendicular to the stem/calyx axis to an axis of rotation about the stem/calyx axis as a function of time for five different types of size 128 apples, and FIG. 6B illustrating the same results for five different types of size 88 apples;

DETAILED DESCRIPTION OF THE PREFERRED EMBODIMENT

Figure 1A:
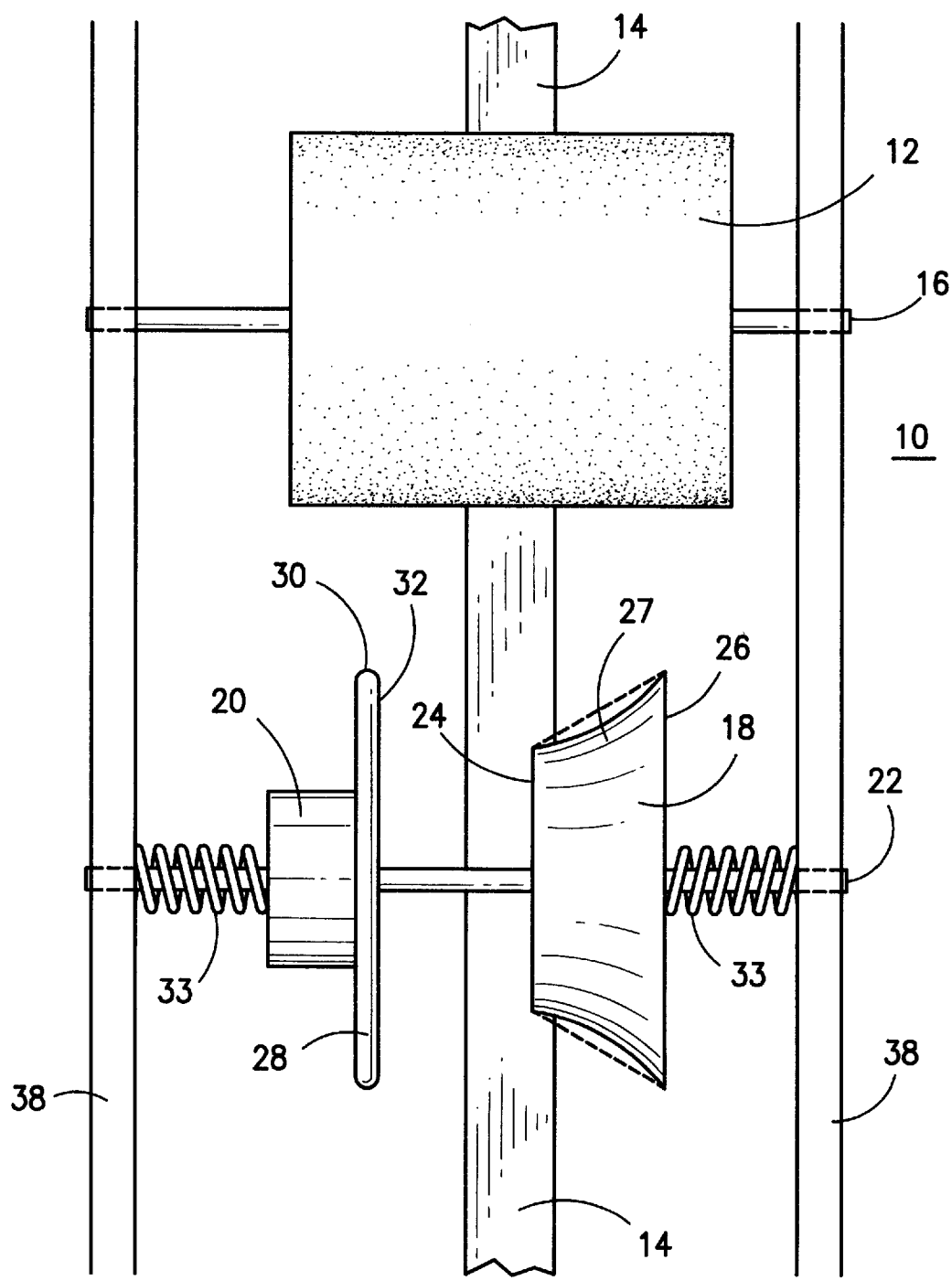
FIG. 1A is a top view of a fruit or other produce orienting device constructed in accordance with a preferred embodiment of the present invention.
Figure 1B:
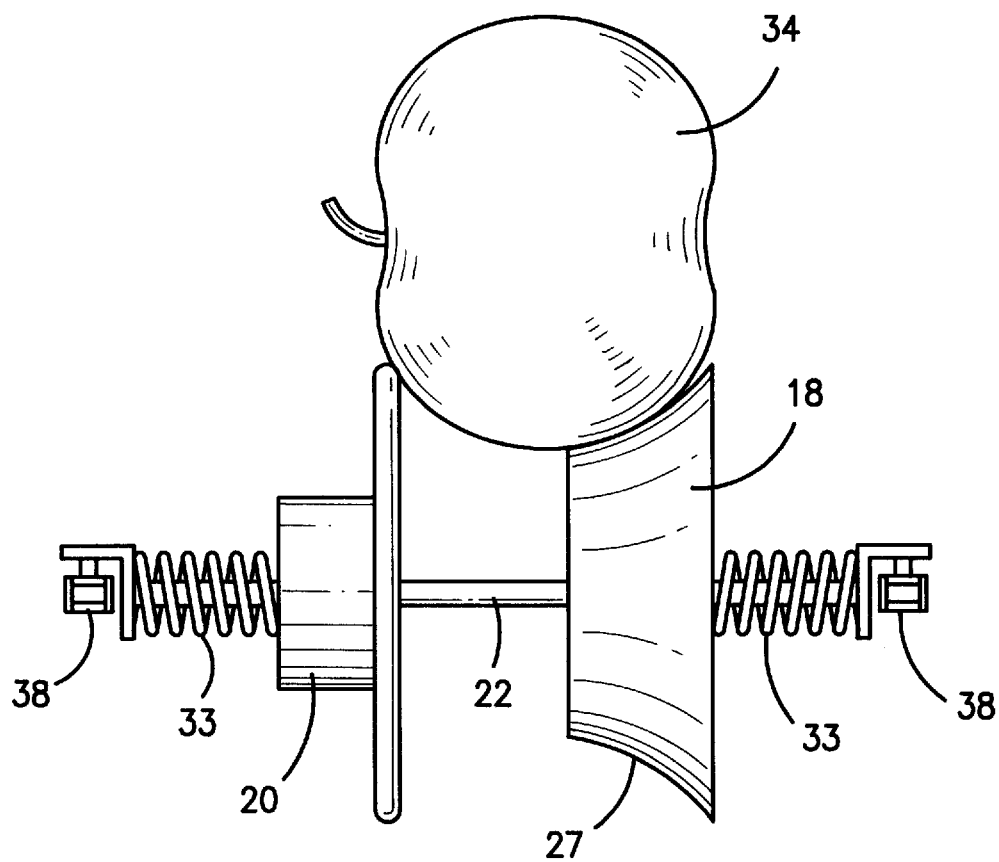
FIG. 1B is a front elevation of the fruit orienting device of FIG. 1A showing its rollers engaging a properly oriented apple.
Figure 2:
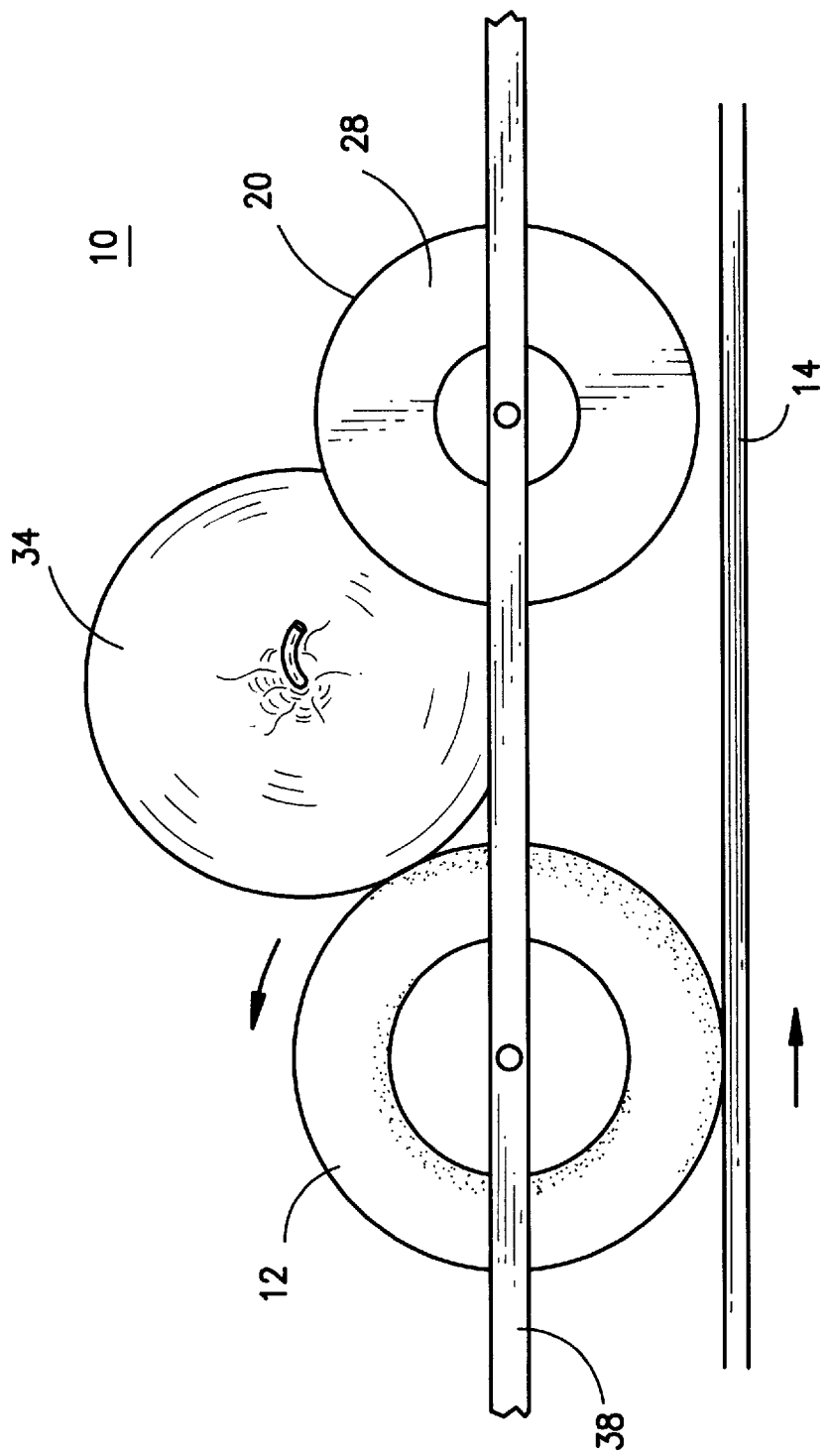
FIG. 2 is a side view of the device of FIGS. 1A and 1B.
Figure 3:
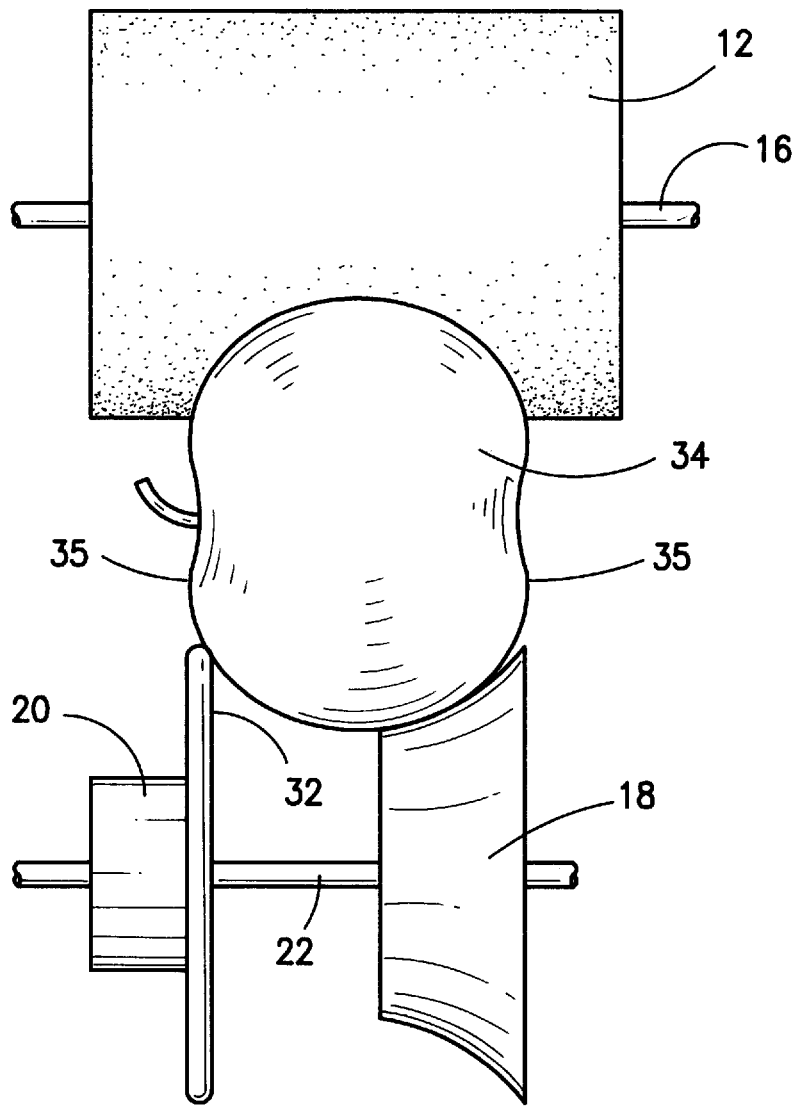
FIG. 3 is another top view of the device of FIG. 1A showing its rollers engaging a properly oriented apple.

Turning now to a detailed consideration of a preferred embodiment of the present invention, FIGS. 1–3 illustrate a fruit or other produce orienting device 10 comprising a cylindrical drive roller 12 which is rotated by a power source, such as a motor (not shown), through a drive belt 14. The cylindrical drive roller 12 preferably has a soft resilient (e.g. padded) surface, and is mounted on a first horizontal shaft 16. Preferably it has a length (e.g., 3.75 inches) that is somewhat greater than the typical height of the fruit to be oriented (e.g., an apple).

First and second orienting rollers 18 and 20 are mounted for free rotation on a second horizontal shaft 22, which is positioned parallel to the first shaft 16, and is spaced therefrom by a distance of preferably approximately 4–5 inches. The first orienting roller 18 is cone shaped with an inner end diameter 24 that is preferably approximately 2 inches, and an outer end diameter 26 that is preferably larger, for example, approximately 3 inches, thereby forming a tapered peripheral or outer engaging surface 27 which is tapered in the direction of the second orienting roller 20. The thickness of the cone shaped roller 18 is preferably approximately 1 inch. Preferably, the outer engaging surface 27 is concave in shape as illustrated to better accommodate the spherical shape of the fruit or other produce to be oriented, thereby further improving the orienting performance of the device 10 when used to orient cultivars, for example, which are difficult to orient. Alternatively, the outer engaging surface 27 can be flat as illustrated by the dashed lines in FIG. 1A, and still provide good results as discussed below in conjunction with FIGS. 7 and 8.

The second orienting roller 20 has a disk shaped portion 28 having a diameter approximately equal to that of the outer diameter 26 of the cone shaped roller 18. The disk portion 28 includes a rounded edge 30, and has a thickness of approximately 3/16 inches. A front, flat engaging surface 32 is formed generally perpendicular to the axis of the second horizontal shaft 22 for engaging the surface of the fruit to be oriented. Preferably, both of the rollers 18 and 20 are spring loaded toward each other by a pair of compression springs 33 of equal length and spring rate which allow lateral movement for varying sizes of fruit.

As illustrated in FIGS. 2 and 3, the particular spacing and arrangement of the drive roller 12 and orienting rollers 18 and 20, enables the drive roller 12 to engage an apple 34 or other generally similar shaped object to be oriented and rotate the same, while the orienting rollers 18 and 20 engage the apple 34 on a generally opposite side thereof. As also illustrated in FIG. 3, the front engaging surface 32 of the disk shaped portion 28 is designed to engage one of the flat shoulder portions 35 of the apple 34 positioned adjacent its stem or calyx ends.

The two roller shafts 16 and 22 are fixed at their opposite ends to first and second conveyor chains 38. As illustrated in FIG. 4, a plurality of the devices 10 are preferably incorporated into a conveying apparatus 40 which conveys a plurality of pieces of fruit to be inspected past a sensor device 44, which by way of example can be an imaging device for visually inspecting the apple cheeks, a firmness testing device or any other device for sensing the apple's condition.

In operation, randomly oriented apples are conveyed onto a plurality of the devices 10, where they are each engaged at three locations on their surfaces by the drive roller 12 and the orienting rollers 18 and 20 of their corresponding device. As the apple is rotated by the drive roller 12, the cone shaped roller 18 tends to move the apple into engagement with the disk shaped roller 20. When this occurs, the apple has a tendency to seek a position where its largest diameter (its width) engages the drive roller 12 and one of its ends (stem or calyx) contacts the disk shaped roller 20, with the axis of rotation for the fruit lying along its shortest dimension, which is the apple's height. Because of these tendencies, the front engaging surface 32 of the disk shaped roller 20 tends to align itself with the flat edge of the apple at either the stem or calyx ends, and provides stability to the revolving apple once it is oriented.

Figure 7:
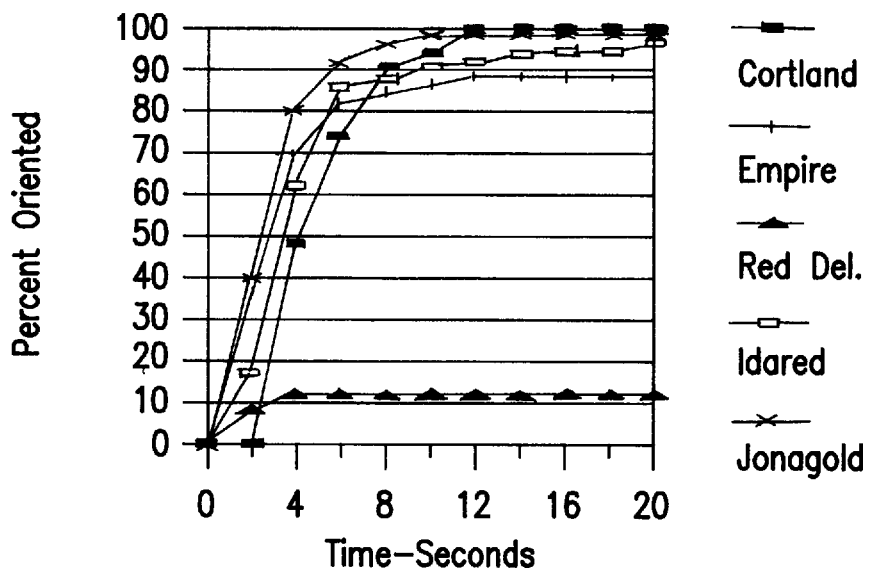
FIGS. 7 and 8 are graphs illustrating experimental results obtained using flat surfaced roller variation of the preferred embodiment of the present invention to orient apples, with FIG. 7 illustrating the percentage of apples properly oriented as a function of time for five different types of apples and FIG. 8 illustrating the percentage of apples maintaining their proper orientation as a function of time.
Figure 8:
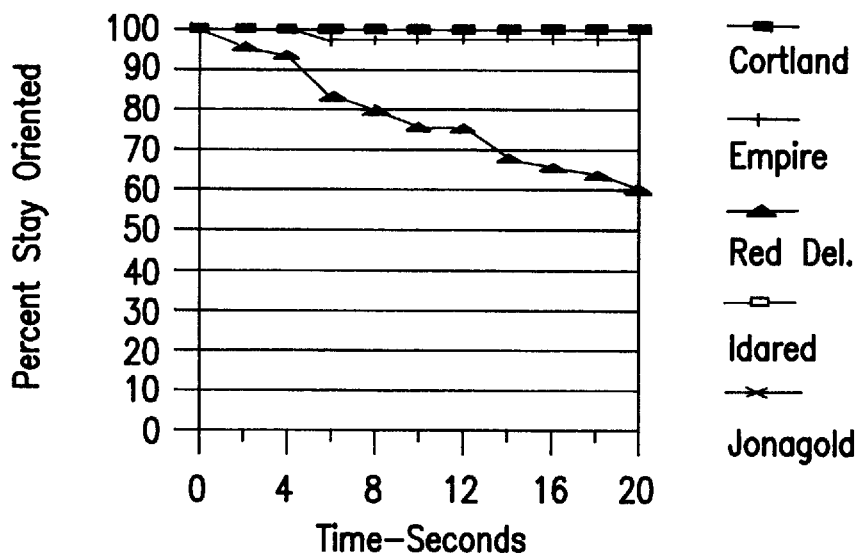

Experiments were conducted to compare the orientation success rate of the preferred embodiment of the present invention using both concave and flat surfaced orienting rollers with that of the previously discussed known apple orienting device. The results of these experiments are illustrated in FIGS. 5–10, with FIGS. 5A, 5B, 6A and 6B illustrating the results obtained with the preferred embodiment of the present invention using a concave orienting roller, FIGS. 7 and 8 illustrating the results obtained with the preferred embodiment of the present invention using a flat surfaced orienting roller, and FIGS. 9 and 10 illustrating the results obtained using the known orienting device.

FIGS. 5A and 5B illustrate that the orienting device 10 with the concave surfaced orienting roller was able to orient 95 to 100% of various sizes of Cortland, Empire, Fuji, Jonagold, McIntosh and Rome apples within approximately 0.2 minutes. FIGS. 6A and 6B illustrate the experimental results obtained with various sizes of apples that are known to be difficult to orient because of a greater variation in both size and shape, including Golden Delicious, Granny Smith, Crispin, Red Delicious and small Galla apples. With the exception of large Granny Smith and Crispin apples, successful orientation was achieved 60 to 82 percent of the time.

Experiments were also conducted using the flat surfaced orienting roller variation of the preferred embodiment which performs well when used to orient the less difficult to orient types of apples. As illustrated in FIG. 7, the flat surfaced roller variation correctly orients the stem/calyx axis into the horizontal position (parallel to the axis of roller rotation) of Cortland, Jonagold, Idared and Empire apples 88 to 100% of the time, and within 12 seconds. Once oriented, the device 10 is virtually 100% successful at maintaining the proper orientation of the apples as illustrated in FIG. 8.

Figure 9:
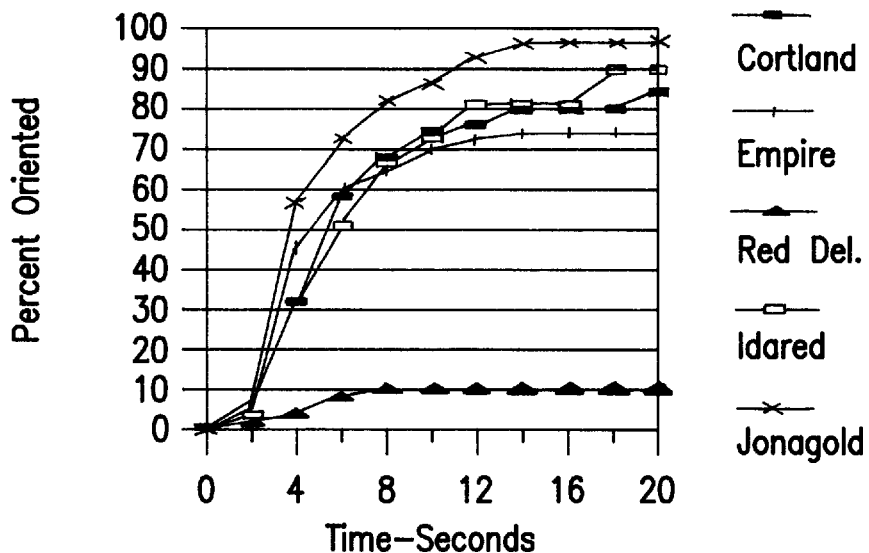
FIGS. 9 and 10 are graphs illustrating experimental results obtained using a known apple orienting device, with FIG. 9 illustrating the percent of apples correctly oriented as a function of time for five different types of apples, and FIG. 10 illustrating the percent of apples maintained in the correct orientation as a function of time.
Figure 10:
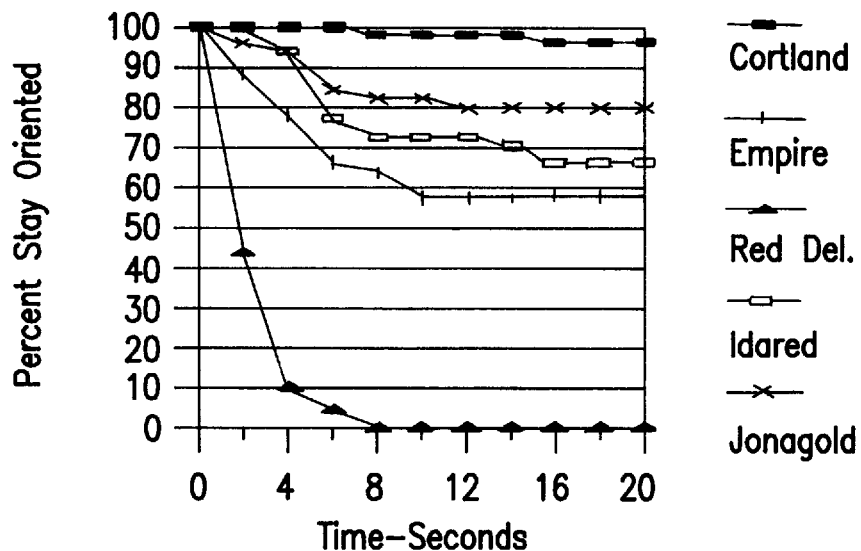

In contrast, experiments with the known orienting device employing a pair of opposed cone shaped rollers, indicate in FIG. 9 that this technique is successful at properly orienting the various types of apples 73–95% of the time after a period of 16–18 seconds. In addition, once the apples were oriented, many of them lost their orientation within 10 seconds as illustrated in FIG. 10.

It should be pointed out that neither the flat surfaced roller embodiment of the present invention nor the known orienting device were particularly successful at orienting Red Delicious apples as can be noted from a careful inspection of the graphs in FIGS. 7–10. This is because many Red Delicious apples tend to have an elongated pear shape with a much different fruit diameter at the stem end than at the calyx end, and the calyx end of this type of Red Delicious apple does not present a good shoulder surface for the flat surface 32 of the disk roller 20 to engage. However, as discussed above in conjunction with FIGS. 6A and 6B, the concave surfaced roller variation of the preferred embodiment works considerably better at orienting Red Delicious, and other difficult to orient, apples.

In conclusion, the present invention provides an improved fruit orienting device that is particularly suited for orienting fruit or other produce, such as apples, about to undergo a quality inspection. The device provides a substantially greater orientation success rate, achieves the proper orientation in less time and better maintains the orientation once achieved than any previously known fruit orientation devices. This is particularly significant when the device is employed with automatic apple sorting devices which must inspect large quantities of apples for bruises and other defects, and sort the apples accordingly in a fast, efficient and dependable manner.

Although the present invention has been disclosed in terms of a preferred embodiment, it will be understood that numerous other modifications and variations could be made thereto without departing from the scope of the invention as defined in the following claims. For example, although the invention is designed specifically for orienting fruit, specifically apples, it will be understood that it can also be employed for orienting other similarly shaped produce, such as vegetables. In fact, the present invention can be employed for orienting any generally spherical shaped object having some type of asymmetry, such as a stem, defining a longitudinal axis.

What is claimed is:

1. A device for orienting generally spherical shaped objects having a longitudinal axis comprising:
   a) a drive roller for engaging and rotating an object to be oriented;
   b) a first orienting roller spaced from said drive roller and positioned parallel thereto, said first orienting roller having an outer end diameter larger than an inner end diameter, and an outer periphery thereof forming a tapered object engaging surface; and
   c) a second orienting roller spaced from said first orienting roller, said second orienting roller having a disk shaped portion with a front surface for engaging an object to be oriented;
   wherein, said drive roller and said first and second orienting rollers are positioned to engage a generally spherical object in three locations, and cause orientation of the object with its longitudinal axis in a generally horizontal direction.

2. The object orienting device of claim 1, wherein said drive roller is disposed for rotation on a first shaft, and said first and second orienting rollers are disposed for rotation on a second shaft which is spaced from, and parallel to, said first shaft.

3. The object orienting device of claim 2, wherein said first and second shafts are spaced from one another by approximately 4 to 5 inches.

4. The object orienting device of claim 2, wherein said first orienting roller has an inner end diameter of approximately 2 inches.

5. The object orienting device of claim 4, wherein said first orienting roller has an outer end diameter of approximately 3 inches.

6. The object orienting device of claim 2, wherein said first and second orienting rollers are spring loaded on said second shaft toward each other.

7. The object orienting device of claim 2, wherein said first orienting roller has a concave outer surface.

8. A method for orienting generally spherical shaped objects so that a longitudinal axis of each of said objects is disposed in a generally horizontal position comprising the steps of:
   a) providing a rotatable drive roller for engaging and rotating an object to be oriented;
   b) providing first and second spaced orienting rollers for engaging and orienting an object being rotated by said drive roller, said first and second orienting rollers being positioned for rotation about a common axis that is spaced from and parallel to a rotational axis of said drive roller, said first orienting roller having a tapered outer surface with an inner end diameter smaller than an outer end diameter, and said second orienting roller including a disk shaped portion with a flat front surface facing said first orienting roller;
   c) engaging and rotating an object to be oriented with said drive roller; and
   d) simultaneously engaging said object with said tapered outer surface of said first orienting roller and said flat front surface of said second orienting roller, wherein said tapered outer surface tends to direct said object into said flat front surface, and thereby cause orientation of said object with its longitudinal axis in a generally horizontal position.

* * * * *